United States Patent [19]

Araki

[11] Patent Number: 5,055,238

[45] Date of Patent: Oct. 8, 1991

[54] DIAPHRAGM CARBURETOR

[75] Inventor: Satoru Araki, Ebina, Japan

[73] Assignee: Shinagawa Diecast Industrial Corp., Zama, Japan

[21] Appl. No.: 539,795

[22] Filed: Jun. 18, 1990

[30] Foreign Application Priority Data

Jun. 30, 1989 [JP] Japan .................................. 1-169204

[51] Int. Cl.[5] .............................................. H02M 3/08

[52] U.S. Cl. ........................................ 261/35; 261/67; 261/71; 261/DIG. 38; 261/DIG. 68

[58] Field of Search ............... 261/DIG. 38, DIG. 68, 261/67, 71, 35

[56] References Cited

U.S. PATENT DOCUMENTS

| | | | |
|---|---|---|---|
| 3,275,306 | 9/1966 | Phillips | 261/DIG. 68 |
| 3,409,277 | 11/1968 | Reise | 261/DIG. 38 |
| 3,618,906 | 11/1971 | Charron | 261/DIG. 38 |
| 3,992,490 | 11/1976 | Preston | 261/DIG. 38 |
| 4,414,163 | 11/1983 | Donovan et al. | 261/DIG. 68 |

FOREIGN PATENT DOCUMENTS

| | | | |
|---|---|---|---|
| 2434891 | 10/1975 | France | 261/DIG. 38 |
| 4742424 | 8/1970 | Japan | 261/DIG. 38 |

OTHER PUBLICATIONS

Tillotson Carburetors, HC and HN Series Bulletin, Tillotson Mfgr. Co., Toledo 12, Ohio, Received 1-2-4-67.

*Primary Examiner*—Tim Miles

*Attorney, Agent, or Firm*—Lyon & Lyon

[57] ABSTRACT

There is disclosed herein an arrangement for limiting the rotation of adjustment valves which control main and idle fuel paths in a diaphragm carburetor. The valves are disposed relatively close together and have caps that are configured to act as stoppers for each other so as to limit the maximum rotation of each valve.

5 Claims, 1 Drawing Sheet

DIAPHRAGM CARBURETOR

This invention relates to a diaphragm carburetor suitable for supplying fuel to a two-cycle engine used as a power source for farm machinery, gardening machinery, light vehicles, and the like.

BACKGROUND

Diaphragm carburetors generally used to supply fuel to two-cycle engines are configured so that fuel fed from a fuel pump is regulated at a fixed pressure by a fuel pressure regulator, and is sent to the intake path. The fuel pressure regulator is equipped with a fuel chamber that stores fuel sent from the fuel pump. A diaphragm that forms one of its walls and a control valve that is interlocked to the motion of the diaphragm opens and closes the fuel chamber inlet. Thus in any position, fuel can be supplied properly to the engine. As a means of feeding fuel chamber fuel to the intake path, the carburetor is equipped with both a main fuel path that leads to a main nozzle that is open to a venturi and an idle fuel path that leads to slow and idle ports that are open to the side of a throttle valve.

However, a diaphragm carburetor has a very low fuel flow rate compared with a float-type carburetor that supplies fuel to a four-cycle engine (e.g., an automobile engine). Therefore, even if the locations and dimensions of the main nozzle, idle port, slow port, and fuel path deviate only slightly, fuel flow rate fluctuation increases so it becomes impossible to supply the proper amount of fuel. Moreover, the diaphragm that operates the inlet valve by sensing the fuel chamber pressure varies in quality, and thus the flexibility or rigidity differ greatly. Therefore, the fuel chamber fuel cannot be regulated at a given fixed pressure.

Therefore, in order to eliminate fuel supply variation caused by quality variation and dimensional deviation in the diaphragm carburetors, a manual adjustment valve is provided for independently controlling the effective areas of the main and idle fuel paths, and a carburetor or engine specialist inspects and adjusts each product before shipment.

However, the adjustment valve comprises a needle-shaped valve that changes, in a non-stepwise manner, the effective area of the fuel path into which it is inserted, a screw that is screwed into the carburetor and moves back and forth while turning a valve, and a head that projects from the carburetor and is used to turn the screw. The adjustment valve can be turned freely, even by users of light vehicles and machines with such a diaphragm-carburetor-equipped engine as the power source. Thus, in an attempt to adjust an out-of-tune engine or to improve engine performance, the user sometimes manually turns the most accessible adjustment valve. The user then frequently over-rotates it, thereby misadjusting the fuel flow rate, which easily worsens the exhaust composition and engine operation. Moreover, if the user rotates both valves, it will affect the entire engine operation.

Thus, in such prior devices manual adjustment valves that independently control the effective areas of the main and idle fuel paths are easily rotatable by a general user, so there is a risk of misadjusting the fuel flow rate, thereby degrading both the exhaust composition and the engine operation.

The present invention is directed at providing a diaphragm carburetor that prevents the degradation of exhaust composition and engine performance by allowing the general user to rotate the adjustment valves only within a limited range.

SUMMARY OF THE INVENTION

In order to solve the aforementioned problem inherent in diaphragm carburetors equipped with, (a) main and idle fuel paths for sending fuel regulated at a fixed pressure to the intake path, and (b) manual adjustment valves for independently controlling the effective areas of these two fuel paths, an exemplary embodiment of this invention provides caps that limit the rotation of the adjustment valves within a fixed range that are locked to the heads of the two adjustment valve screws that project from the carburetor.

In this configuration it is preferable to, (a) position the heads of the two adjustment valve screws close together so that their caps act as stoppers that prevent each other from rotating in one direction, and also if desired (b) mark the caps so that the main and idle fuel path caps are readily distinguishable.

In order to produce the proper fuel supply, the effective areas of the main and idle fuel paths are adjusted during factory assembly, and the caps are locked to the heads before shipment. When a general user turns the cap, adjustment valve rotation is limited to a specific fixed range, and the effective areas of both fuel paths vary only within a fixed range so the fuel flow rate is not greatly misadjusted.

Figure 1:
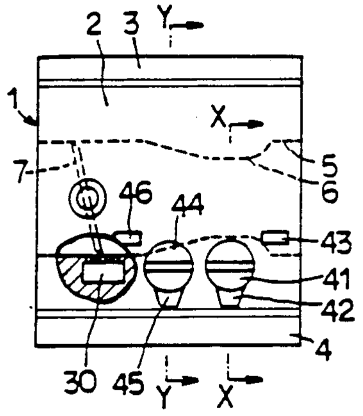
FIG. 1 is a partially cutaway front view of an exemplary embodiment of this invention.

Turning now to the drawings, an exemplary embodiment of the present invention is shown comprising a carburetor 1 which includes a body 2 with an intake path 5 that extends horizontally, and covers 3 and 4 installed above and below the body 2. An intake path 5 has a venturi 6 and a throttle valve 7.

Figure 4:
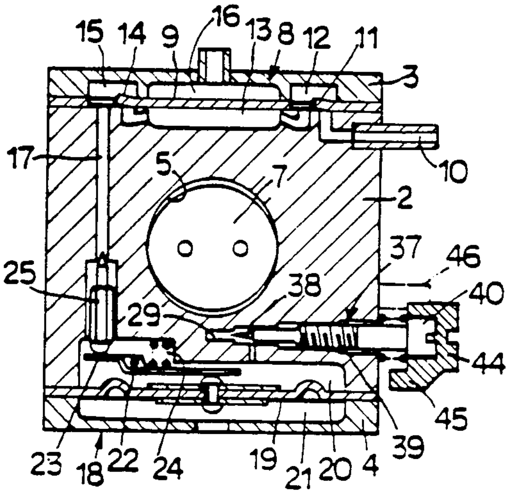

Diaphragm 9 of fuel pump 8 as seen in FIG. 4 is sandwiched between body 2 and top cover 3. The fuel in the fuel tank (not shown) passes from fuel pipe 10 through inlet valve 11, inlet chamber 12, pump chamber 13, outlet valve 14, and outlet chamber 15, and is fed, via fuel path 17, to fuel regulator 18. The pulse pressure generated in the engine crankcase is introduced into pulse chamber 16 which faces pump chamber 13 (both of which sandwich diaphragm 9), and the fuel is sucked into pump chamber 13, from which it is dispensed, all of which is known in the art.

A diaphragm 19 of fuel pressure regulator 18 is sandwiched between body 2 and bottom cover 4, and said diaphragm divides fuel chamber 20 above from air chamber 21 below. Lever 23, which is supported in free rotation by pin 22 and is housed in fuel chamber 20, is pressed by spring 24, so it contacts the center of diaphragm 19 and its end supports control valve 25 that opens and closes fuel path 17. When the pressure drops in fuel chamber 20, diaphragm 19 bends upward, opening control valve 25. When the pressure rises, diaphragm 19 bends downward, closing control valve 25. In this manner, fuel chamber 20 is always kept at a given fixed pressure, which is also as known in the art.

The fuel in fuel chamber 20 enters nozzle chamber 27 via main fuel path 26. From there, it is fed to intake path 5 from main nozzle 28 that opens into the narrowest part of venturi 6. In addition, it enters port chamber 30 via idle fuel path 29. From here, it is fed to intake path 5 from slow port 32 and idle port 31 that open onto the side of throttle valve 7. The effective areas of main fuel path 26 and idle fuel path 29 are independently controllable by manual adjustment valves 33 and 37. Adjustment valves 33 and 37 comprise needle-shaped valves 34 and 38 that are enclosed in fuel paths 26 and 29 and vary the effective areas in a non-stepwise manner; screws 35 and 39 that are screwed into body 2 and are tipped with valves 34 and 38; and heads 36 and 40 that project from body 2. When heads 36 and 40 are turned using a tool such as a screwdriver, the rotation moves valves 34 and 38 forward and backward.

Figure 2:
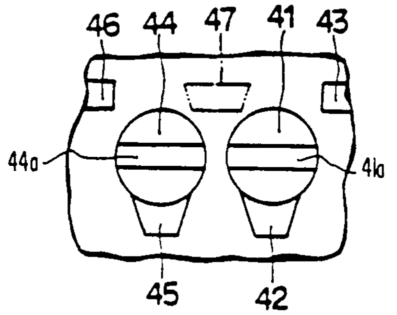
FIG. 2 is an enlarged section of FIG. 1.
Figure 3:
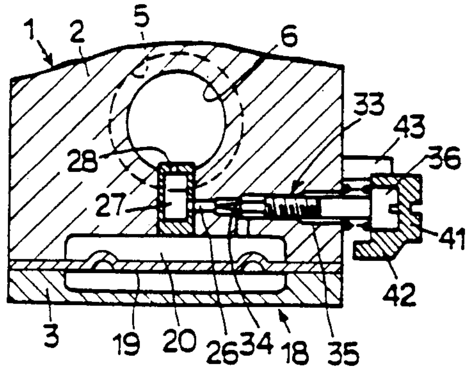
FIGS. 3 and 4 are enlarged cross-sections along X—X and Y—Y in FIG. 1.

In this example, and according to the present invention, the two adjustment valves 33 and 37 are positioned near each other and with their axes in parallel. Heads 36 and 40 are exposed from body 2 at the same height. Caps 41 and 44 with projections 42 and 45 that project to one side are locked on these heads 36 and 40. When one cap 41 is turned counterclockwise in FIGS. 1 and 2, valve 34 of adjustment valve 33 is backed out, thereby enlarging the effective area of main fuel path 26. Projection 42 then stops at the position where it collides with first stopper 43 which projects from carburetor body 2. On the other hand, when valve 34 is driven in by turning cap 41 clockwise, projection 42 stops at the position where it collides with adjacent cap 44. Also, when other the cap 44 is rotated clockwise in FIGS. 1 and 2, valve 38 of adjustment valve 37 is driven in, thereby reducing the effective area of idle fuel path 29. Projection 45 then stops at the position where it collides with second stopper 46 that projects from body 2. By contrast, when valve 38 is backed out by turning cap 44 counterclockwise, projection 45 stops at the position where it collides with adjacent cap 41.

Thus the two caps 41 and 44 act as stoppers for each other, so the external shape of the body can be simplified by reducing the number of stoppers to 43 and 46 on body 21. In this instance, if a stopper is provided at the place indicated by dotted line 47 in FIG. 2, only one stopper is required (stoppers 43 and 46 are eliminated), so the external shape can be simplified further. If, however, the two stoppers 43 and 46 indicated by solid lines are provided, the movable range of adjustment valves 33 and 37 is about 180 degrees, so the adjustment range of the fuel flow rate is minimized.

The two caps 41 and 44 are readily distinguishable if they are colored different colors (for example, red for the main fuel path 26 side and white for the idle fuel path 29 side). Alternatively, the caps can be distinguished using suitable marks as characters or symbols. The two adjustment valves 33 and 37 need not be positioned in parallel as long as heads 36 and 40 are continuous so that their caps 41 and 44 act as stoppers for them. The screwdriver slots 41*a* and 44*a* of the caps 41 and 44 may have closed sides (not extended all the way across the cap) to help keep a screwdriver in the slot during adjustment.

Therefore, according to this invention, caps that control rotation within a fixed range are locked to the heads of adjustment valves that independently control the effective areas of the main and idle fuel paths. Therefore, if a specialist adjusts the carburetor to the proper fuel flow rate and attaches the caps before shipment, the general user can only turn the adjustment valve within a restricted range to make adjustments. This minimizes the chances of the user degrading the exhaust composition or mistuning the engine by adjusting either (or both) the main or idle fuel flow rates.

If the two caps are installed as stoppers for each other, only a few stoppers formed so as to project from the carburetor body are required, simplifying the external shape. Moreover, identification marks on the caps allow the carburetor to be readjusted without fear of malfunction.

While embodiments of the present invention have been shown and described, various modifications may be made without departing from the scope of the present invention, and all such modifications and equivalents are intended to be covered.

What is claimed is:

1. A diaphragm carburetor comprising an idle fuel path and a main fuel path for transmitting to an intake path fuel adjusted to a given pressure, and manual adjustment valves for independently regulating the effective areas of the said two fuel paths, the manual adjustment valves including caps that restrict within a fixed range of one hundred eighty degrees or less the rotation of said adjustment valves, said adjustment valves comprising screws which extend into said two fuel paths and said screws have heads, and said caps comprise cap members locked to the respective screw heads and projecting from the diaphragm carburetor to act as stoppers to engage one another to thereby limit rotation in one rotation direction for each valve, and the carburetor has a carburetor body from which the caps of said adjustment valves extend, and said body comprises a pair of stoppers located adjacent said caps to thereby limit rotation in a second rotation direction for each valve.

2. A diaphragm carburetor comprising an idle fuel path and a main fuel path for transmitting to an intake path fuel adjusted to a given pressure, and manual adjustment valves for independently regulating the effective areas of the said two fuel paths, the manual adjustment valves including caps that restrict within a fixed range of less than three hundred sixty degrees the rotation of said adjustment valves, wherein said adjustment valves comprise screws which extend into said two fuel paths and said screws have heads, and said caps comprise cap members locked to the respective screw heads and projecting from the diaphragm carburetor, and wherein the heads of the screws of the two adjustment valves are disposed close together, and their respective cap members act as stoppers to engage one another to thereby limit rotation in one rotation direction for each valve.

3. A diaphragm carburetor as in claim 2 wherein the carburetor has a carburetor body from which the caps of said adjustment valves extend, and said body comprises a pair of stoppers located adjacent said caps to thereby limit rotation in a second rotation direction for each valve.

4. A diaphragm carburetor comprising an idle fuel path and a main fuel path for transmitting to an intake path fuel adjusted to a given pressure, and manual adjustment valves for independently regulating the effective areas of the said two fuel paths, the manual adjustment valves including caps that restrict within a fixed range of less than three hundred sixty degrees the rotation of said adjustment valves, wherein each of said caps comprises a projection radially extending from the respective axes of said valves, and the two adjustment valves being disposed sufficiently close together that the projection on one cap limits its rotation in one direction by engaging the cap of the other valve, and said carburetor having a body with projections thereon to limit rotation of each valve in an opposite direction.

5. A diaphragm carburetor comprising an idle fuel path and a main fuel path for transmitting to an intake path fuel adjusted to a given pressure, and manual adjustment valves for independently regulating the effective areas of the said two fuel paths, the manual adjustment valves including caps in combination with a projection on the carburetor that restrict within a fixed range of less than three hundred sixty degrees the rotation of said adjustment valves, wherein each of said caps comprises a projection radially extended from the respective axes of said valves, and the two adjustment valves being disposed sufficiently close together that the projection on one cap limits its rotation in one direction by engaging the cap of the other valve, and said carburetor having a body with projections thereon to limit rotation of each valve in an opposite direction.

* * * * *

US005055238A

REEXAMINATION CERTIFICATE (2195th)

United States Patent [19]

[11] B1 5,055,238

Araki

[45] Certificate Issued Jan. 18, 1994

[54] DIAPHRAGM CARBURETOR

[75] Inventor: Satoru Araki, Ebina, Japan

[73] Assignee: Shinagawa Diecast Industrial Corp., Zama, Japan

Reexamination Request:
No. 90/002,900, Nov. 25, 1992

Reexamination Certificate for:

| | |
|---|---|
| Patent No.: | **5,055,238** |
| Issued: | **Oct. 8, 1991** |
| Appl. No.: | **539,795** |
| Filed: | **Jun. 18, 1990** |

[30] Foreign Application Priority Data

Jun. 30, 1989 [JP] Japan .................................. 1-169204

[51] Int. Cl.[5] .............................................. F02M 3/08

[52] U.S. Cl. ........................................ 261/35; 261/67; 261/71; 261/DIG. 38; 261/DIG. 68

[56] References Cited

U.S. PATENT DOCUMENTS

| | | | |
|---|---|---|---|
| 3,275,306 | 9/1966 | Phillips | 261/DIG. 68 |
| 3,409,277 | 11/1968 | Reise | 261/DIG. 38 |
| 3,618,906 | 11/1971 | Charron | 261/DIG. 38 |
| 3,992,490 | 11/1976 | Preston | 261/DIG. 38 |
| 4,414,163 | 11/1983 | Barr et al. | 261/DIG. 68 |

FOREIGN PATENT DOCUMENTS

| | | |
|---|---|---|
| 2434891 | 10/1975 | Fed. Rep. of Germany . |
| 47-42424 | 10/1972 | Japan . |
| 61-134555 | 8/1986 | Japan . |

OTHER PUBLICATIONS

Tecumseh Power Products Co. Drawings; Power Products division; Tecumseh Products; Grafton, Wis.; Jul. 18, 1964.

Tillotson Carburetors HC and HN Series Bulletin, Tillotson Manufacturing Co., Parts and Service Division, Toledo 12, Ohio, Oct. 1962.

*Primary Examiner*—Tim R. Miles

[57] ABSTRACT

There is disclosed herein an arrangement for limiting the rotation of adjustment valves which control main and idle fuel paths in a diaphragm carburetor. The valves are disposed relatively close together and have caps that are configured to act as stoppers for each other so as to limit the maximum rotation of each valve.

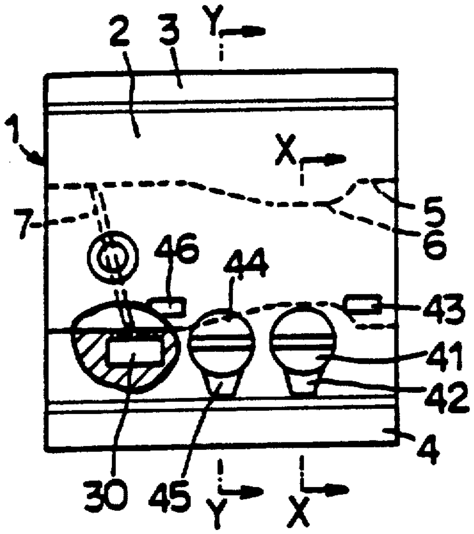

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5 are cancelled.

* * * * *